United States Patent [19]

Tanaka et al.

[11] Patent Number: 5,416,894
[45] Date of Patent: May 16, 1995

[54] METHOD FOR DETERMINING A CANDIDATE OF A BRANCHED DIRECTION OF A LINEAR IMAGE

[75] Inventors: Yutaka Tanaka; Naruto Takasaki, both of Yokohama, Japan

[73] Assignee: Hitachi Software Engineering Co., Ltd., Kanagawa, Japan

[21] Appl. No.: 960,816

[22] Filed: Oct. 14, 1992

[30] Foreign Application Priority Data

Oct. 14, 1991 [JP] Japan .................................. 3-291917

[51] Int. Cl.⁶ ............................................ G06F 15/62
[52] U.S. Cl. .................................... 395/133; 395/138; 395/142; 395/143; 364/474.03; 364/474.24
[58] Field of Search ............... 395/133, 135, 138, 142, 395/143, 150; 364/474.03, 474.22–474.25, 474.27; 382/16, 19, 23, 48

[56] References Cited

U.S. PATENT DOCUMENTS 4,975,853 12/1990 Shimizu et al. ................. 364/474.24

Primary Examiner—Almis Jankus
Attorney, Agent, or Firm—Fay, Sharpe, Beall, Fagan, Minnich & McKee

[57] ABSTRACT

A linear image is traced on the basis of an instruction to trace the linear image through an image processing system for processing a trace of the linear image of data of an image, having an image memory for storing the data of the image, a data memory for storing data of a graphic, a display unit for displaying the data of the image and the data of the graphic, an input unit for entering the instruction, and a semi-automatic image trace processing section for processing the trace of the linear image on the basis of the instruction. The candidate of the branched direction is detected by tracing the linear image having a line width smaller than a predetermined line width; setting a point on a contour line of the linear image as a first trace base point when the trace detects a branched point at which the line width of the linear image to be traced expands temporarily; transferring the first trace base point on the contour line by a predetermined distance and setting a point existing on the contour line opposite to the contour line on which the first trace base point is located and in the position closest to the first trace base point, as a second trace base point; and detecting a middle point between the first trace base point and the second trace base point as a candidate of the branched direction.

10 Claims, 7 Drawing Sheets

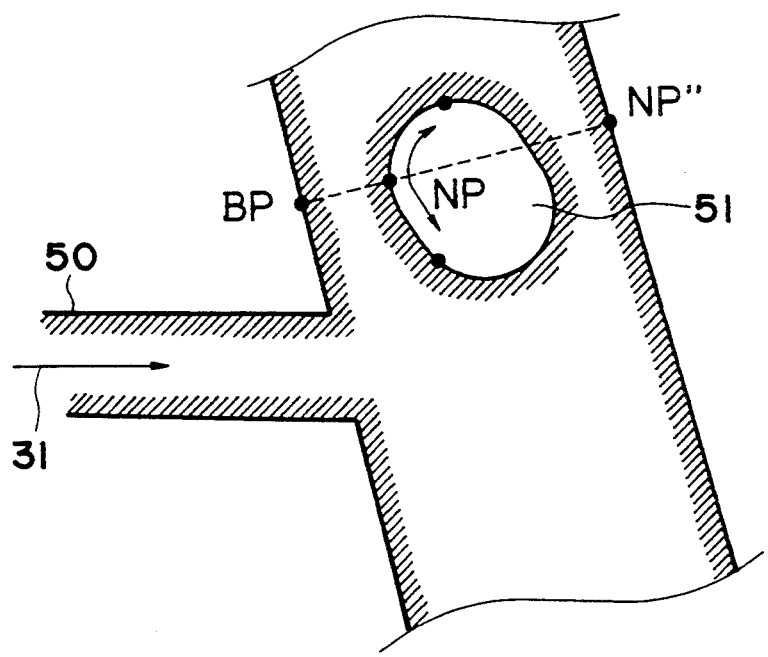

METHOD FOR DETERMINING A CANDIDATE OF A BRANCHED DIRECTION OF A LINEAR IMAGE

BACKGROUND OF THE INVENTION

The present invention relates to a method for the detection processing for detecting a candidate of a branched direction and, more particularly, to a method for the detection processing for detecting a candidate of a branched direction, so adapted as to efficiently and accurately perform the detection processing for detecting the candidate of the branched direction for a linear image having a branch in tracing the linear image in an interactive way with an image processing system such as a computer-aided design (CAD) device and the like.

Heretofore, as a method for entering a drawing drawn on paper into a graphics processing system, it is common that the drawing is entered as data of an image through an image scanner or the like, the data of the image is displayed on a display screen through the graphics processing system, and the image is then traced and entered manually with a pointing device or the like, while the operator is looking at the data of the image on the display screen.

For example, Japanese Patent Publication Laid-open (kokai) No. 62-269,276/1987 discloses a graphic input system of an interactive type, which involves entering the drawing into a computer as data of an image through a scanner, displaying the data of the image and data of an image of central lines on the display screen in a superimposed way, and entering the drawing as data of a vector by indicating a necessary position of the drawing on the display screen with a coordinate indicator.

When the data of the image are to be converted into data of a graphic such as the data of the vector as in the manner described hereinabove, for instance, data of centers (central lines) of the image are given, and data on characteristic points of the image, such as terminal points, branched points, corner points and the like, are entered by selecting them from the continuous central line of the data of the centers and indicating them. In this instance, in order to allow the characteristic points to be entered with ease, the data of the centers are superimposed with the data of the image on the display screen in order for the operator to clearly and readily distinguish the characteristic points, and the characteristic points are then entered on the basis of the indication of input by the operator. This system suffers from the disadvantage that the display on the display screen may be made complicated and, as a consequence, an operation for selecting the necessary data by the operator may not be performed with efficiency.

Further, in order that the data of the image are to be converted into the data of the graphic such as the data of the vector, Japanese Patent Publication Laid-open (kokai) No. 60-117,374/1985 proposes a system for approximating polygons of a linear graphic as an example in which data of a linear graphic are given from data of contours of the image without processing for breaking the lines into smaller line sections. This system requires to give the data on the contour lines for all the data of the image in advance when the linear image is converted from the data of the contour lines into the linear graphic.

In addition, an image processing system having a function for the semi-automatic image trace processing has been developed, which is so arranged as to semi-automatically trace points of an image by providing an instruction to trace the data points of the image, to determine the characteristic points, and to enter the data of the graphic for the characteristic points. This function of the semi-automatic image trace processing requires a function for appropriately determining a candidate of a branched direction at a branched point in order to trace the linear image in a correct way.

Furthermore, it can be noted that, for example, when a linear image in the data of the image is subjected to semi-automatic trace processing by giving the instruction to trace the data points of the image—for example, when the semi-automatic image trace processing of the image processing system is applied to the data of the image in a map and the linear image of the image in the map is traced—the data of the image which the operator is required to convert into the data of the graphic include roads, a topographical map, and the like, not symbols, characters, and the like.

In the trace processing, the operator is thus required to determine a traceable direction at a branched point when the trace has reached the branched point, when the function for the semi-automatic image trace processing is employed, which requires the operator to answer to an inquiry about which direction the trace should proceed. The system for approximating the polygons of the linear graphic as proposed hereinabove, however, requires to give data on all the contour lines as preprocessing, even if only one location of a branched point should be investigated. Thus, the prior art system requires a long period of time for useless operations.

SUMMARY OF THE INVENTION

Therefore, it is an object of the present invention to solve the problems inherent in the conventional techniques and systems with the semi-automatic image trace processing function and to provide a method for the detection processing for detecting a candidate of a branched direction, so adapted as to efficiently and accurately perform the detection processing for detecting the candidate of the branched direction by tracing the data of the linear image and converting the traced data into data of a linear graphic in the semi-automatic image trace processing with an image processing system.

In order to achieve the aforesaid object, the present invention consists of a detection processing method for detecting the candidate of the branched direction, which is characterized in that, in an image processing system for performing the trace processing for tracing a linear image on the basis of an instruction to trace, having an image memory for storing data of an image, a data memory for storing data of a graphic, a display unit for displaying the data on the image and the graphic, an input unit for providing the instruction to trace, and a semi-automatic image trace processing section for tracing the linear image of the data of the image; a linear image having a line width smaller than a predetermined line width; when a branched point where a line width of the traced linear image expands temporarily is detected; a point existing on a contour line of the traced linear image is set as a first trace base point; said first trace base point is transferred on the contour line in such a sufficient distance as reaching a second point that exists in the position nearest from said first trace base point and on the contour line opposite to the contour line with said first trace base point located thereon, and said second point is set as a second trace base point; and a middle point between said first trace base point and said second trace base point is detected as the candidate of the branched direction.

The semi-automatic image trace processing section built in the image processing system is so adapted as to trace the linear image having the line width smaller than the predetermined line width, when the instruction to trace is entered by indicating the linear image as the object of trace. When the branched point where the line width of the traced linear image expands temporarily is detected upon tracing the linear image, the processing for detecting the candidate of the branched direction is performed. The processing for detecting the candidate of the branched direction may be performed, for example, by a branch processing section of the image processing system, which is so arranged as to perform the processing for detecting the candidates of the branched direction at the branched point one after another, to display the direction of the candidate in which the linear image branches at the branched point, and to wait for the instruction to trace from the operator.

In the processing for detecting the candidate of the branched direction, one point on the contour line of the linear image is set as the first trace base point; the first trace base point is allowed to move on the contour line by a distance sufficient to reach a second point existing in the position nearest from said first trace base point yet on the contour line opposite to the contour line with said first trace base point located thereon; the second point is set as the second trace base point; and then the middle point between the first trace base point and the second trace base point is detected as the candidate of the branched direction. After one candidate of the branched direction has been detected, the second trace base point is set as another first trace base point for determining a second candidate of a branched direction and this new first trace base point is then transferred by a sufficient distance on the contour line to give a new second trace base point that exists in the position closest to the new first trace base point and on the contour line opposite to the contour line with the new first trace base point located thereon; a middle point between the new first trace base point and the new first trace base is given for the second candidate of the branched direction; and the new second trace base point is further treated in the same manner to give a plurality of the candidates of the branched directions one after another.

As the method according to the present invention can give the candidates of the branched directions one after another, the branched direction of the traced linear image can be determined by investigating the status of the contour line of the linear image in which the branched points are detected, without performing any pre-processing for a whole portion of the linear image. Further, the detection processing for detecting the candidate of the branched direction can be performed during the trace processing for tracing the linear image, so that the function inherent in the semi-automatic image trace processing can be realized with high efficiency, without asking the operator for an instruction to trace.

Other objects, features and advantages of the present invention will become apparent in the course of the description of the preferred embodiments, which follows, with reference to the accompanying drawings.

BRIEF DESCRIPTION OF THE DRAWINGS

FIG. 11 is a schematic representation showing an example of the processing step in the instance where there is a concave portion in a linear image to be subjected to the detection processing for detecting the candidate of the branched direction.

DESCRIPTION OF THE PREFERRED EMBODIMENTS

Figure 1:
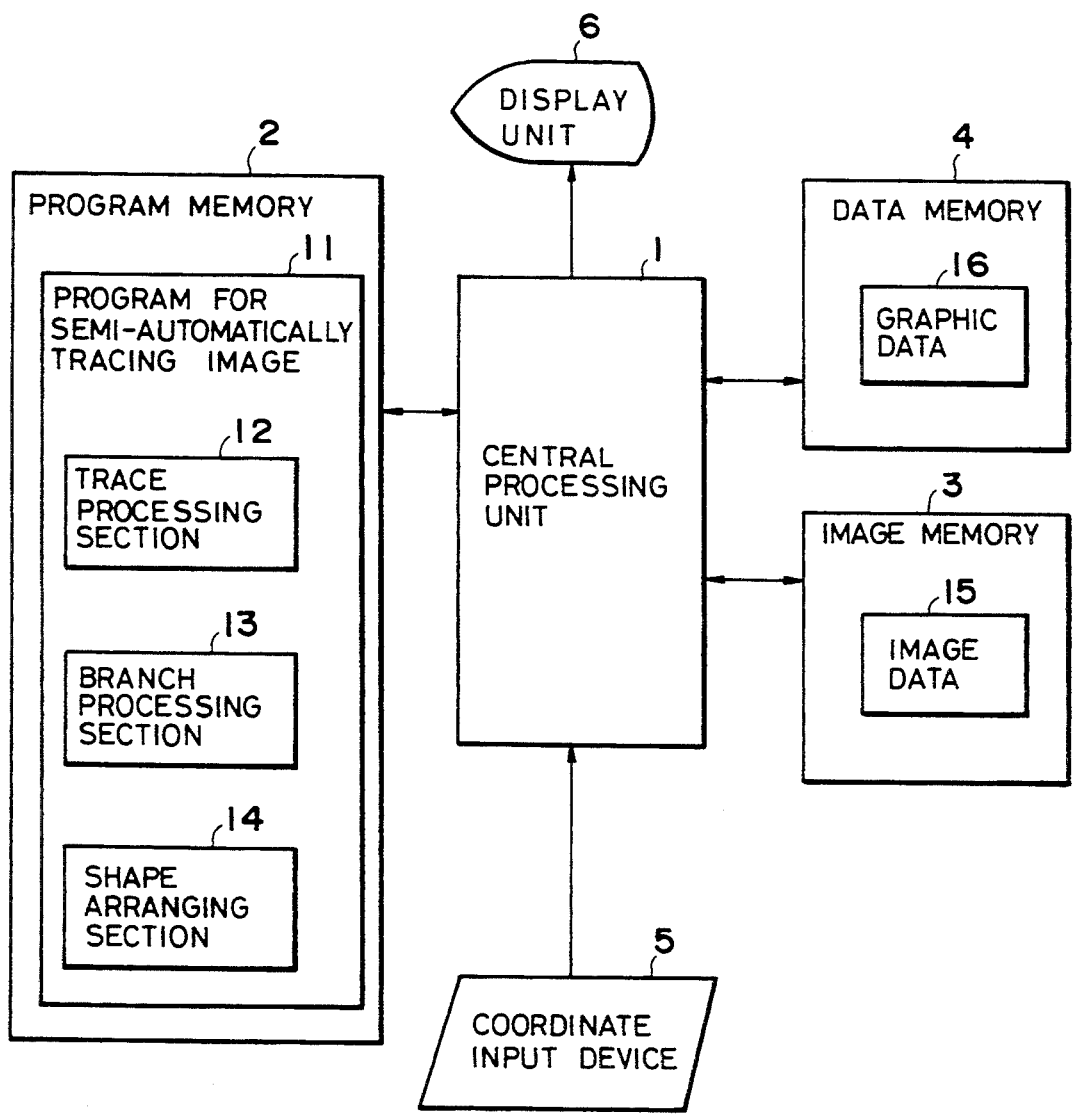
FIG. 1 is a block diagram showing the system configuration of an image processing system according to an embodiment of the present invention.

The present invention will now be described more in detail by way of examples with reference to the accompanying drawings, FIG. 1 is a block diagram showing the system configuration of the image processing system according to an embodiment of the present invention. The image processing system comprises a central processing unit 1 for performing the processing for a variety of programs, a program memory 2 for storing a program required for the processing to be performed by the central processing unit 1, an image memory 3, a data memory 4, a coordinate input device 5 for entering coordinates, and a display unit 6 for displaying data and the like on a display screen.

The program memory 2 is so adapted as to store a program 11 for semi-automatic image tracing which in turn contains a sub-program for a trace processing section 12 for performing the trace processing for tracing a linear image, a sub-program for a branch processing section 13 for performing the processing for determining a candidate of a branched direction to be traced, when a branched point is detected in tracing the linear image, and a sub-program for a shape arranging section 14 for arranging and converting a traced result into data of a graphic.

The image memory 3 is so adapted as to store data 15 of an image containing a linear image as the object of tracing, and the data memory 4 is so adapted as to store data 16 of a graphic as a digitized result obtained by converting the traced result into the data of the graphic as data of a vector.

As the device 5 for entering the coordinates, there may be employed a pointing device such as a mouse, a trace ball or the like, and data of a coordinate value is entered on the basis of the position of a cursor on the display screen of the display unit 6. The coordinate input device 5 is employed together with an output into the display screen of the display unit 6, and as an interactive input device for entering instructions from the operator in an interactive way.

In the image processing system so configured in the manner as described hereinabove, the trace processing section 12 of the semi-automatic image tracing program 11 is so adapted as to perform the trace processing for tracing a sequence of continuous black pixels in a linear image of data 15 of an image of the image memory 3. The trace processing for tracing the linear image by the trace processing section 12 is commenced semi-automatic by displaying the linear image of the data of the image as the object of tracing on the display screen of the display unit 6 and then entering the instruction to trace indicating the linear image to be traced.

The trace processing for tracing the linear image may be performed, for example, by focusing two points existing on both contour lines of the linear image as the object of tracing, and by registering a middle point between the two points on the contour lines one after another while transferring the two points in the same directions on the respective contour lines. The trace processing section 12 is so adapted as to determine the status of the linear image while tracing it and to ask the operator for a tracing direction to go ahead when the trace processing section 12 has a branched point at which the line width of the linear image expands temporarily; in other words, when it has detected a branch point having the line width of the linear image expanding temporarily during the course of tracing the linear image having the line width smaller than a predetermined line width. On the other hand, the branch processing section 13 is so adapted as to commence the detection processing for determining the candidate of the branched direction upon an answer by the operator to the inquiry from the trace processing section 12.

The detection processing for detecting the candidate of the branched direction is so adapted as to perform the detection of the candidate of the branched direction in the linear image in the vicinity of the branched point. First, a point existing on the contour line of the linear image is determined as a first trace base point, and the first trace base point is transferred on the contour line by a sufficient distance as a point that exists on the contour line opposite to the contour line including the first trace base point and in a position shortest therefrom, thereby setting this point as a second trace base point. Thereafter, the second trace base point is transferred on the same contour line by a sufficient distance to reach another point which in turn is set as a third trace base point. Then, the third trace base point is transferred on the contour line to give a point that exists on the contour line opposite to the contour line having the third trace base point and in a position nearest from the third trace base point, and this point is set as a fourth trace base point. Further, a first middle point between the first and second trace base points and a second middle point between the third and fourth trace base points are determined, and a direction obtained by connecting the first middle point of a first set of the trace base points with the second middle point of a second set of the trace base points is determined as a first candidate of a branched direction.

Further, the trace base points are transferred and new sets of the trace base points are determined in the same manner as described hereinabove, thereby performing the detection processing for detecting the candidates of the branched directions and setting the candidates thereof one after another. More specifically, the second trace base point set for determining the second candidate of the branched direction is set as a new first trace base point for determining another candidate of the branched direction and the another candidate of the branched direction is determined in the same manner as described hereinabove. This detection processing is repeated and the candidates of the branched direction are detected one after another. By investigating the status of the contour line at the branched points of the linear image in the manner as described hereinabove, the branched direction can be detected without performing any pre-processing for the image. Further, the candidate of the branched direction can be determined accurately by detecting two sets of the two points existing on the contour lines of the linear image for determining a particular candidate of a branched direction when a branch point is detected on the linear image.

Furthermore, for instance, it can be decided that the direction of the candidate of the branched direction cannot be traced as a linear image by investigating the status of the two sets of the points existing on the contour lines of the linear image, so that the branched direction can be restricted in an efficient way when the trace processing is to be performed in a semi-automatic fashion. This arrangement permits a good trace processing for tracing an image when the data of the linear image is to be converted into the data of the graphic in an interactive way by the semi-automatic image trace processing.

Figure 2:
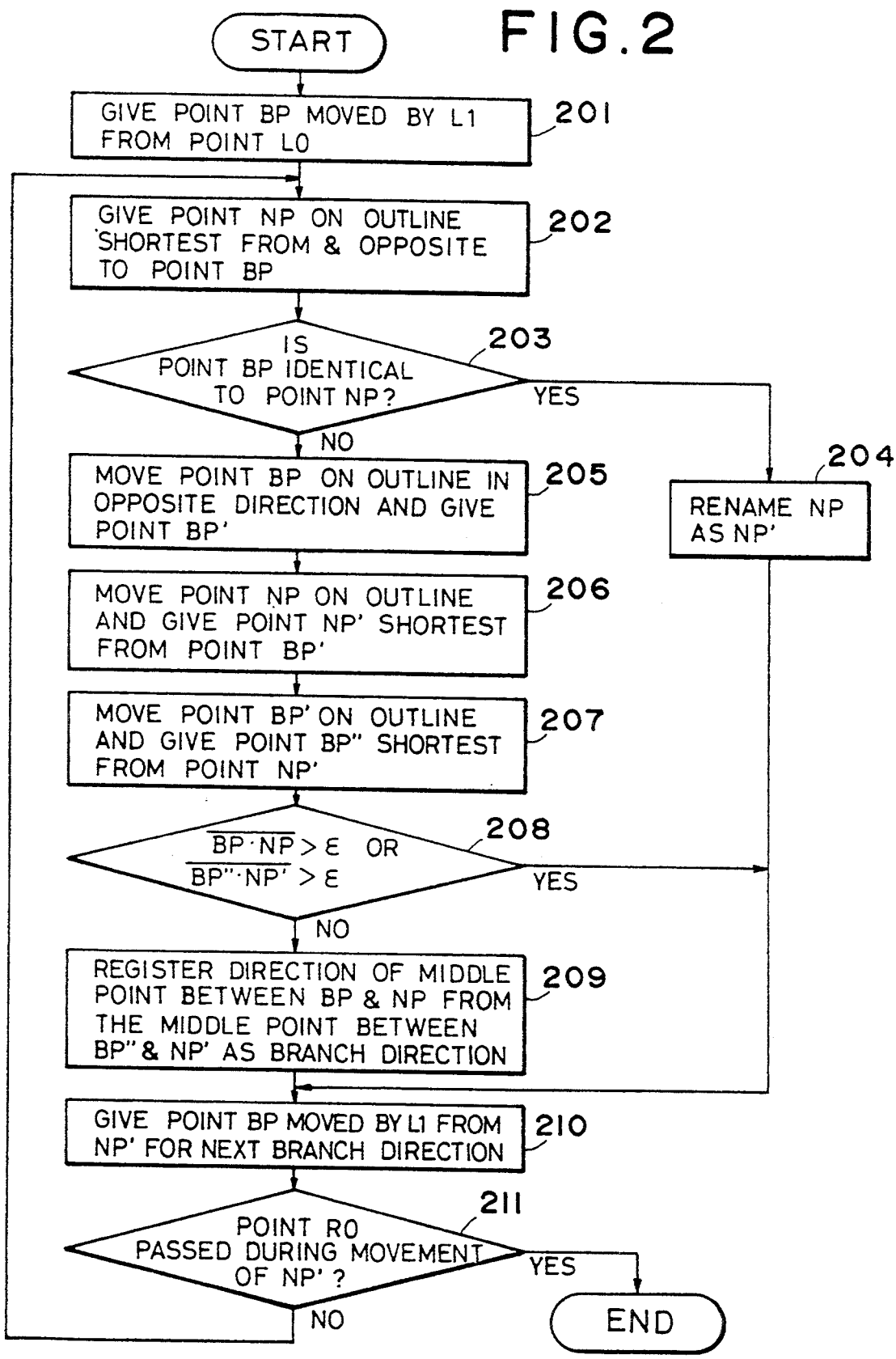
FIG. 2 is a flowchart showing the processing flow of a branch processing section for determining a candidate of a branched direction in an image of a branched line.
Figure 3:
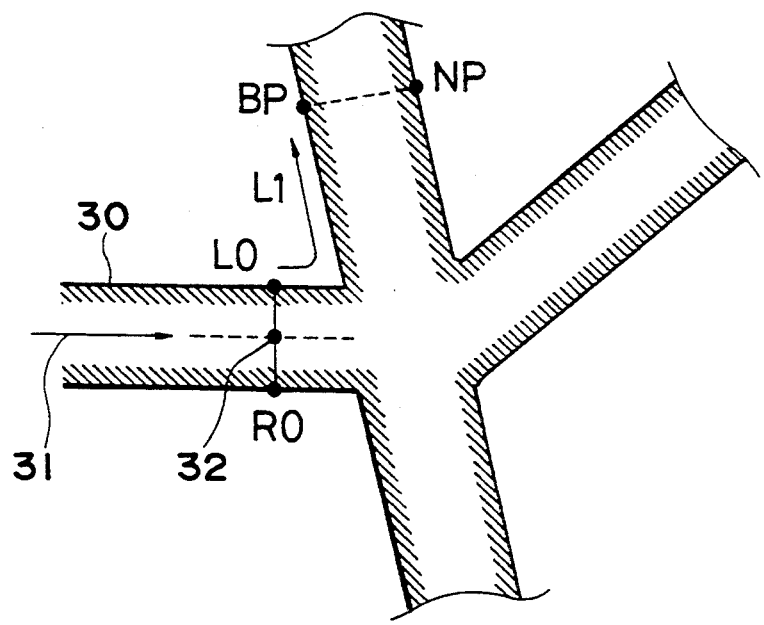
FIG. 3 is a schematic representation showing an example of setting a first set of a trace base point (a first trace base point) and a shortest point (a second trace base point) in a detection processing method for detecting the candidate of the branched direction.
Figure 4:
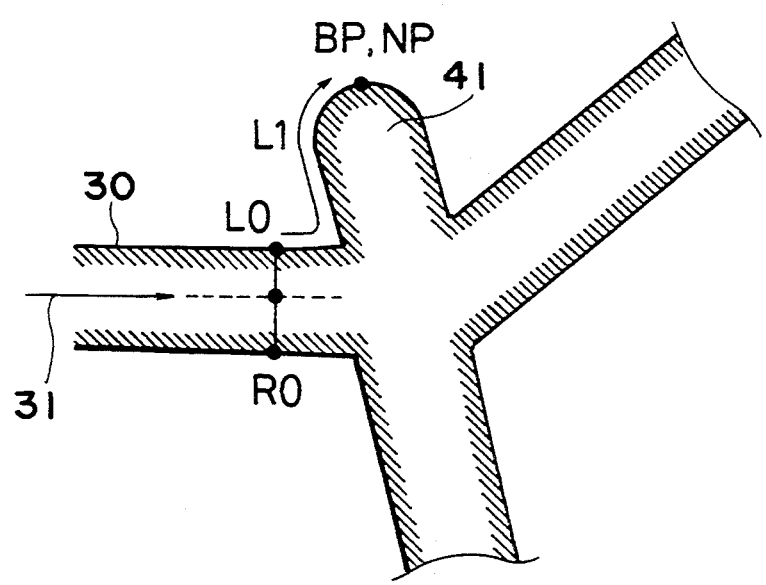
FIG. 4 is a schematic representation showing an example in which no candidate of a branched direction is determined because a concave portion of the image of the branched line is considered to be a noise.
Figure 5:
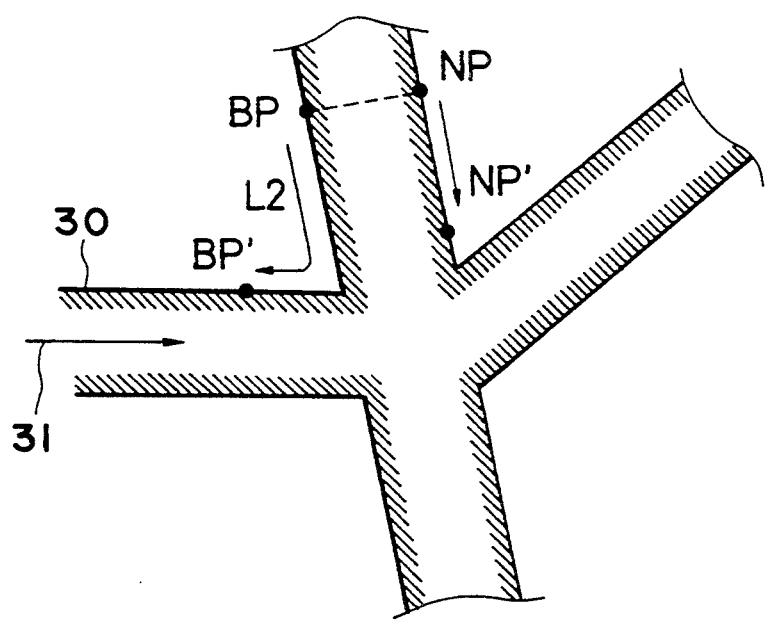
FIG. 5 is a schematic representation showing an example of the processing step for determining a second set of the trace base point and the corresponding shortest point.
Figure 6:
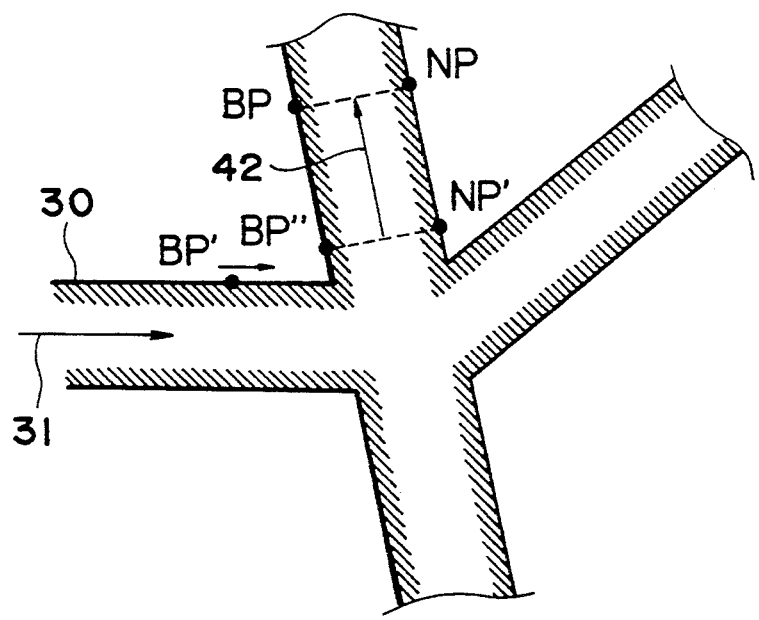
FIG. 6 is a schematic representation showing an example of setting the second set of the trace base point and the corresponding shortest point.
Figure 7:
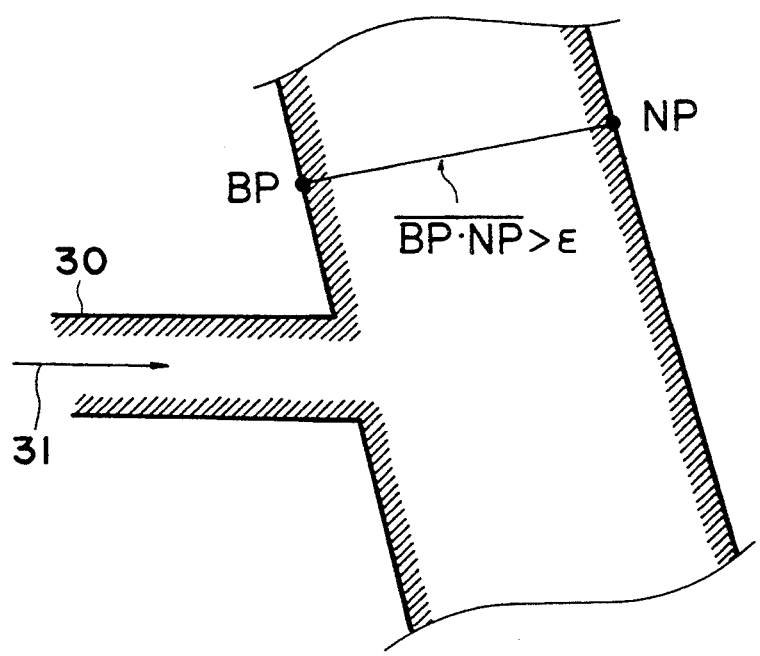
FIG. 7 is a schematic representation showing an example in which no candidate of a branched direction is determined because the image of the branched line is not considered to be a line.
Figure 8:
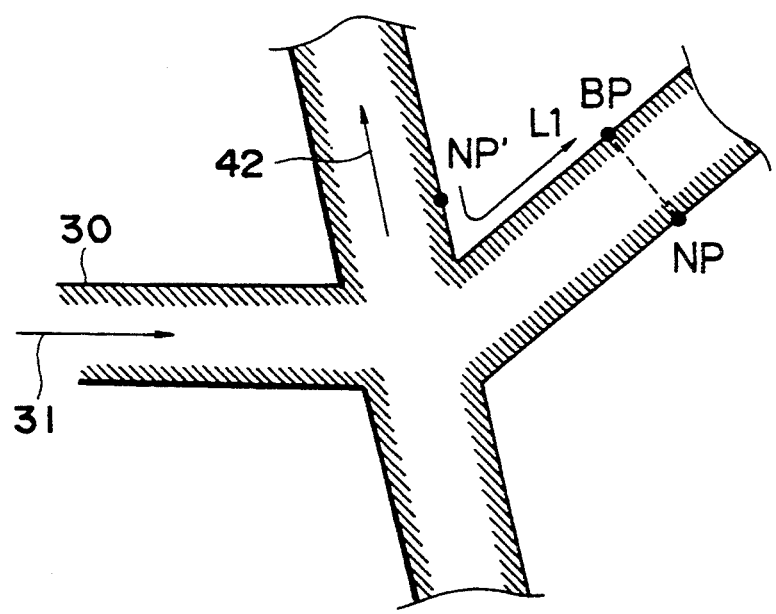
FIG. 8 is a schematic representation showing an example of the processing step for determining the candidates of the branched directions one after another.
Figure 9:
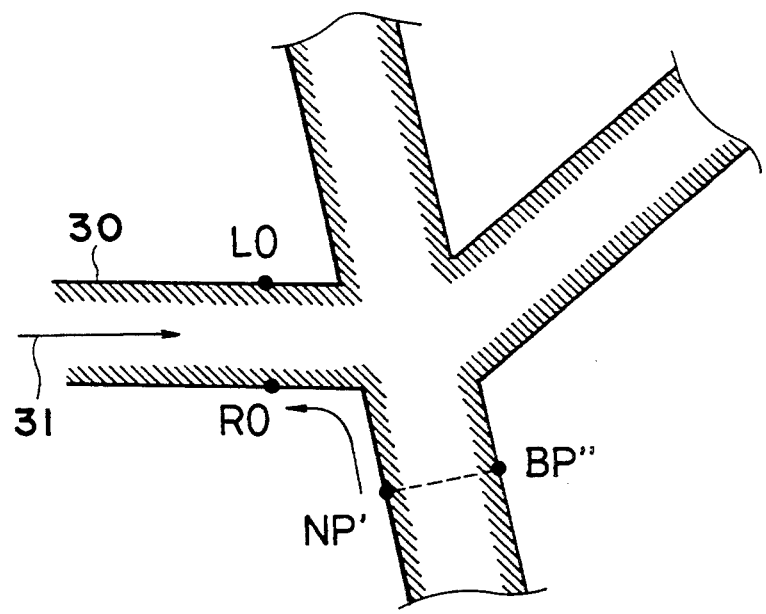
FIG. 9 is a schematic representation showing an example of the status of the end of the detection processing for detecting the candidate of the branched direction.
Figure 10:
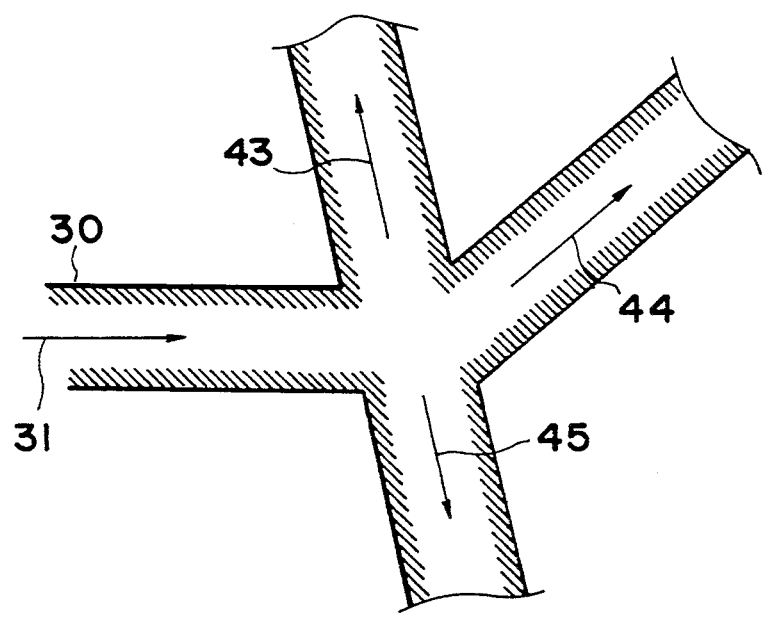
FIG. 10 is a schematic representation showing an example of a plurality of the candidates of the branched directions determined for an image of a branched line.

FIG. 2 is a flowchart showing the processing flow of the branch processing section for determining the candidates of the branched directions in the image of a branched line, and FIGS. 3 to 11, inclusive, are schematic representations for describing the operations for the detection processing for detecting the candidates of the branched directions. As described hereinabove, FIG. 3 is a schematic representation showing an example of setting a first set of the trace base point (the first trace base point) and the shortest point (the second trace base point) in the detection processing for detecting the candidate of the branched direction; FIG. 4 is a schematic representation showing an example in which no candidate of the branched direction is determined because the concave portion of the image of the branched line is considered to be a noise; FIG. 5 is a schematic representation showing an example of the processing step for determining the second set of the trace base point and the corresponding shortest point; FIG. 6 is a schematic representation showing an example of setting the second set of the trace base point and the corresponding shortest point; FIG. 7 is a schematic representation showing an example in which no candidate of the branched direction is determined because the image of the branched line is not considered to be a line; FIG. 8 is a schematic representation showing an example of the processing step for determining the candidates of the branched directions one after another; FIG. 9 is a schematic representation showing an example of the status of the end of the detection processing for detecting the candidate of the branched direction; FIG. 10 is a schematic representation showing an example of a plurality of the candidates of the branched directions determined for the image of the branched line; and FIG. 11 is a schematic representation showing an example of the processing step in the instance where there is the concave portion in the linear image to be subjected to the detection processing for detecting the candidate of the branched direction.

A description will now be made of the detection processing for detecting the candidate of the branched direction in the trace processing for tracing the linear image in accordance with the flowchart of FIG. 2 with reference to FIGS. 3 to 11, inclusive. The image of the data 15 of the image displayed on the display screen of the display unit 6 contains a linear image therein, and an extended illustration of the linear image is shown and referred to as a linear image 30 in FIGS. 3 to 10, inclusive. The linear image 30 is subjected to the trace processing in accordance with the trace processing section 12 of the semi-automatic image tracing program 11, and the detection processing for detecting the candidate of the branched direction is commenced by the branch processing section 13 in order to ask the operator for the tracing direction to go ahead, when the branched point at which the line width of the linear image to be traced expands temporarily is detected during the course of tracing the middle points, as traced points 32, of the linear image having the line width smaller than the predetermined line width in a traced direction 31.

The branch processing section 13 is so adapted as to perform the detection processing for detecting the candidate of the branched direction for the image in the vicinity of the branched point of linear image 30 by detecting the branched point for determining the branched direction of the linear image relative to the traced direction 31 and then by registering a traced point 32 as a trace base point for the branch processing, the traced point being determined by returning a predetermined distance in the direction opposite to the traced direction 31. In order to trace the linear image for detecting the candidate of the branched direction when the trace has reached the branched point that expands temporarily in a manner wider than the predetermined line width, a pair of trace base points L0 and R0 are set on the respective contour lines of the traced linear image 30, as shown in FIG. 3, followed by commencing the processing in accordance with the flowchart as shown in FIG. 2.

First, at step 201, the trace base point L0 is moved a predetermined distance L1 on the corresponding outline of the linear image in a previously traced direction and a point BP is set as a first trace base point. Then, at step 202, a point is set which exists on the outline opposite to the outline of the image on which the first trace base point BP exists and in the position shortest from the first trace base point BP, and the point is set as a second trace base point NP, followed by proceeding to step 203.

At step 203, it is decided whether the point BP is identical to the point NP. When the result of decision at step 203 indicates that the point BP is identical to the point NP, on the one hand, it is found, as shown in FIG. 4, that the branched line of the linear image as the object of the detection processing for detecting the candidate of the branched direction is present in such a state, for instance, that the linear image 30 is provided with a convex portion 41. Hence, in this case, it is found that, as the direction of the focusing image in which the branched direction is to be determined is considered to be a noise, there exists no linear image to be traced. Then, the program flow goes to step 204, at which the point NP is set as a point NP', and then to step 210.

When it is decided at step 203 that the point BP is not identical to the point NP, on the other hand, then the program flow goes to step 205. In this case, as it is found that the point NP exists on the contour line opposite to the outline of the image with the point BP that exists on the contour line with the trace base point L0 located thereon, this point NP is set as the second trace base point. More specifically, as shown in FIG. 5, a point BP' is given at step 205 by moving the point BP a predetermined distance L2 on the outline of the linear image in the direction opposite to the direction in which the trace base point has been moved in the processing at step 201 and, at step 206, the point NP is moved on the outline of the linear image on which the point NP exists, and a point that is located in the position shortest to the point BP' is given and set as a point NP'.

Then, at step 207, the point BP' is moved again on the outline of the linear image 30 and a point BP" shortest to the point NP' is given, as shown in FIG. 6. The setting of the point BP" gives two sets of the points: one set of the point BP and the point NP closest thereto, and the other set of the point BP" and the point NP' closest from the point BP".

Now, at step 208, a distance between the points BP and NP and a distance between BP" and NP' are given, and each of the distances is compared with a predetermined line width $\epsilon$. When it is found as a result of comparison that both of the distances are smaller than the predetermined line width $\epsilon$, on the one hand, then the program flow goes to step 209 at which the direction in which the middle point between the points BP" and NP' is connected with and advances toward the middle point between the points BP and NP is registered as a candidate 42 for a branched direction of the image of the branched line, followed by proceeding to step 210. As a result of this processing, one candidate 42 for determining the branched direction is given and registered for the linear image 30, as shown in FIG. 6.

On the other hand, when it is found as a result of comparison at step 208 that either one of the middle points is larger than the predetermined line width $\epsilon$, it can be determined that no linear image to be traced can exist in the traced direction of the focusing linear image, as shown in FIG. 7. Hence, in this case, it is processed that no candidate of the branched direction can be detected and no candidate of the branched direction is registered, followed by proceeding to step 210 for performing the detection processing for detecting another candidate of a branched direction.

Then, in order to find another candidate of the branched direction on the same linear image, the point NP' is set and registered as a trace base point that corresponds to the trace base point L0 from which the detection of the previous candidate of the branched direction has been commenced. At this end, it is processed at step 210 that the trace base point NP' is moved a predetermined distance L1 on the same outline of the linear image to give a certain point in the same manner as described hereinabove, and this point is set as a new point BP (a new first trace base point), as shown in FIG. 8. Likewise, a point located on the contour line opposite to the contour line on which the new point BP exists and in the position closest therefrom is set as a new point NP (a new trace base point NP), as shown in FIG. 8, followed by continuing the detection processing for detecting the candidate of the branched direction.

Further, it is decided at step 211 to determine if the previous candidate of the branched direction is a final candidate of the branched direction by investigating whether the point NP' has passed through the initially preset point R0 of the linear image. If it is decided at step 211 that the point NP' has passed through the point R0, on the one hand, it can be found that the candidate of the branched direction, which would otherwise be subjected to the detection processing which follows, exists at the portion of the linear image from which the trace processing has been commenced, so that a series of the processing is terminated as the detection processing for detecting the candidate of the branched direction has been finished.

When the result of decision at step 211 indicates that the point NP' does not yet pass through the point R0, on the other hand, it can be found that the candidate of the branched direction which will be traced exists at a portion of the linear image different from the linear image from which the detection of the candidate of the branched direction has been commenced and that it may be considered as a different candidate of a branched direction. Hence, in this case, the program flow returns to step 202 and the processing from step 202 is repeated in the manner as described hereinabove for performing the detection processing for detecting another candidate of the branched direction.

The processing at step 211 will be described with reference to FIG. 9, by way of the process for transferring the trace base point existing on the linear image. In this processing, when the point NP' is set for determining the next candidate of the branched direction, after the candidates of the branched directions have been detected one after another, and the point NP' is transferred by the predetermined distance L1 on the contour line of the linear image in the predetermined direction, it is determined if the point NP' has passed through the initially preset trace base point R0. When it is determined that the point NP' has passed through the trace base point R0, then it is found that the candidate of the branched direction to be otherwise further subjected to the detection processing is determined as existing at the portion of the linear image from which the trace has been commenced, so that a series of the processing for detecting the candidates of the branched directions will be ended.

By subjecting the linear image to the detection processing for detecting the candidates of the branched directions one after another in the manner as described hereinabove, for example, the candidates of the branched directions, 43, 44, and 45, are given relative to the traced direction 31 at the respective branched points of the focused linear image 30, as shown in FIG. 10. Hence, whenever the trace has reached the branched point, the operator can display the candidates of the branched directions one after another on the display screen, the candidates being given by the detection processing for detecting the candidates of the branched directions of the traced image, and can give the instruction to proceed with the trace in a given direction.

If there would be a hollow portion 51 in a linear image 50 as shown in FIG. 11, the method according to the present invention is so adapted as to determine the candidate of the branched direction without causing the hollow portion 51 to interfere with the determination of the candidate of the branched direction. In the detection processing for detecting the candidate of the branched direction, as shown in FIG. 11, when the point BP is given as the first trace base point by transferring the previous trace base point, and the point NP is determined as the second trace base point that is located on the contour line opposite to the contour line on which the first trace base point BP exists and in the position closest to the first trace base point BP, the point NP is transferred in a predetermined direction by a distance nearly corresponding to the predetermined line width of the traced linear image to give a point that is closest to the point NP. Further, when it is determined that the point closest to the point NP is returned to the point NP, it is then specified that the point NP is located on the contour line of the hollow portion of the linear image of the image to be traced.

Hence, in this case, the point NP is further extended from the point BP toward the contour line of the linear image, which further exists outside the point NP to give a point NP" that exists on the opposite contour line of the linear image of the traced image. Then, this point NP" is updated to a new point NP and the detection processing for detecting the candidates of the branched directions is performed in the same manner as described hereinabove. This processing allows the detection processing to be performed for the linear image 50 with the hollow portion 51. In summary, the detection processing for detecting the candidates of the branched directions according to the present invention permits the accurate detection of the candidates of the branched directions without interference from noise, an aggregate of images, and the like.

As has been described hereinabove, the method for the detection processing for detecting the candidates of the branched directions according to the present invention permits the accurate detection of the candidates of the branched directions, in determining the branched direction of the linear image traced by means of the semi-automatic image trace processing through the image processing system, without performing any pre-processing for the whole portion of the linear image and without interference from noise, an aggregate of the images and the like, by investigating the status of the contour lines of the linear image in which the branched point is detected. Further, the method according to the present invention allows the detection processing for detecting the candidate of the branched direction to be performed during the course of the trace processing for tracing the linear image, so that the operator can+be requested to answer to an inquiry about the direction to go ahead and, as a result, the functions inherent in the semi-automatic image trace processing can be realized in an efficient manner.

It should be noted that the description of the present invention is directed to the specific embodiments; however, the present invention is not to be interpreted in any respect as restricted to those embodiments and it is readily understood that the present invention may contain any variations and modifications within the scope and the spirit of the present invention.

What is claimed is:

1. An automatic machine-implemented line tracing method for detecting a candidate of a branched direction of a linear image which contains branched lines, by processing a trace of the linear image of image data by an instruction to trace the linear image, comprising the steps of:

initially tracing the linear image at a line width thereof that is smaller than a predetermined line width;

detecting a branch location at which the line width of the linear image is wider than the predetermined line width;

setting a first base point on a first contour of the linear image;

setting a second base point existing on a second contour opposite to the first contour thereof, the second base point being located on the second contour at a position at which the line width of the linear image is smallest as measured from the first base point to the second base point;

transferring the first base point on the first contour by a predetermined distance;

setting a third base point existing on a second contour opposite to the first contour thereof, the third base point being located on the second contour at a position at which the line width of the linear image is smallest as measured from the transferred first base point to the third base point;

detecting a first middle point of the linear image that is halfway between the first base point and the second base point;

detecting a second middle point that is halfway between the transferred first base point and the third base point;

measuring a first distance between the first and second base points;

measuring a second distance between the transferred first and third base points; and determining that a candidate of a branched direction of the linear image exists along a line connecting the first and second middle points when the first and second distances are both smaller than a predetermined line width.

2. A method as claimed in claim 1, further comprising the step of:

selecting first and second traced points by moving the transferred first base point by a second predetermined distance and the second base point to a position at which the line width of the linear image is shortest between the moved first and second base points; and detecting a third middle point between the first and second traced points, such that a direction between the second and third middle points is detected as a candidate of the branched direction.

3. A method as claimed in claim 1, wherein a message is generated stating that no candidate of the branched direction of the linear image is detected in the processing for detecting the candidate of the branched direction, when no second base point is detected on the second contour within a range of movement of the first base point.

4. A method as claimed in claim 1, wherein, after a first candidate of a branched direction of the linear image has been detected, the second base point employed for the detection of the first candidate of the branched direction is set as a new first base point for the detection of a second candidate of a branched direction; the new first base point is transferred on the second contour of the linear image by a predetermined distance; a new second base point is selected which exists on the first contour of the linear image opposite to the second contour thereof and which is located the closest distance from a first traced point set by transferring the new first base point on the second contour; a line connecting a middle point of the line width between the new first base point and a point on the first contour opposite the new first base point with a fourth middle point of the line width between the new second base point and the transferred new first base point is detected as another candidate of a branched direction, such that a plurality of candidates of branched directions are successively detected.

5. A method as claimed in claim 4, wherein, in setting the new first base point on the second contour of the linear image for detecting the next candidate of the branched direction, a message is generated stating that the processing is finished by deciding that all candidates of branched directions at the branched points have been detected when the base point registered at the time of detection of the first branched point is set as the first base point.

6. A method as claimed in claim 1, wherein, after a first candidate of a branched direction of the linear image has been detected, the second base point employed for the detection of the first candidate of the branched direction is set as a new first base point for the detection of a second candidate of a branched direction thereof; the new first base point is transferred on the second contour by a predetermined distance; a new second base point is selected which exists on the first contour line at a position located the shortest line width from the transferred new first base point; the new second base point is transferred on the first contour by a predetermined distance; and a line connected a third middle point of the line width between the new second base point and the transferred new first base point with a fourth middle point of a shortest line width between the transferred new second base point and a point on the opposite contour thereto is detected as a next candidate of a branched direction; such that a plurality of candidates of branched directions are successively detected.

7. A method as claimed in claim 6, wherein, in setting the new first base point on the second contour of the linear image for detecting the next candidate of the branched direction, a message is generated stating that the processing is finished by deciding that all candidates of branched directions at the branched points have been detected when the base point registered at the time of detection of the first branched point is set as the first base point.

8. A method as claimed in claim 1, wherein, in setting the second base point the shortest line width from the first base point, a message is generated stating that no candidate of a branched direction of the linear image is detected when a line width between the first base point and the second base point is larger than the predetermined line width.

9. A method as claimed in claim 1, wherein, in setting the second base point with respect to the first base point, the second base point is transferred in a predetermined direction in a distance nearly corresponding to the line width of the linear image to a first traced point that is remote in the shortest line width from the second base point; when the first traced point is returned again to a previously traced point closest thereto, the first traced point is specified as part of a hollow portion formed in the linear image; and the second base point is further transferred to an exterior contour thereof opposite to the second contour; and a new second base point exists on the opposite contour in the position closest from the first traced point.

10. An automatic machine-implemented line tracing method for detecting a candidate of a branched direction of a linear image which contains branched lines, by processing a trace of the linear image of image data by an instruction to trace the linear image, comprising the steps of:

setting first and second base points on respective first and second contours of the linear image by initially tracing the linear image at a line width thereof that is smaller than a predetermined line width;

transferring the first and second base points in a common direction on the respective contours while monitoring the distance between the first and second base points;

when a branch location is reached during the transferring step at which a distance between the first and second base points is wider than the predetermined line width, transferring the first base point on the first contour by the predetermined distance;

transferring the second base point to a position on the second contour line at which the line width of the linear image is smallest as measured from the first base point to the transferred second base point;

detecting a first middle point of the linear image that is halfway between the first base point and the second base point;

detecting a second middle point that is halfway between the transferred first base point and the transferred second base point;

measuring a first distance between the first and second base points;

measuring a second distance between the transferred first and transferred second base points; and determining that a candidate of a branched direction of the linear image exists along a line connecting the first and second middle points when the first and second distances are both smaller than a predetermined line width.

* * * * *